D. T. TIMBERLAKE.
TRACTION WHEEL.
APPLICATION FILED AUG. 7, 1907.
905,765.
Patented Dec. 1, 1908.
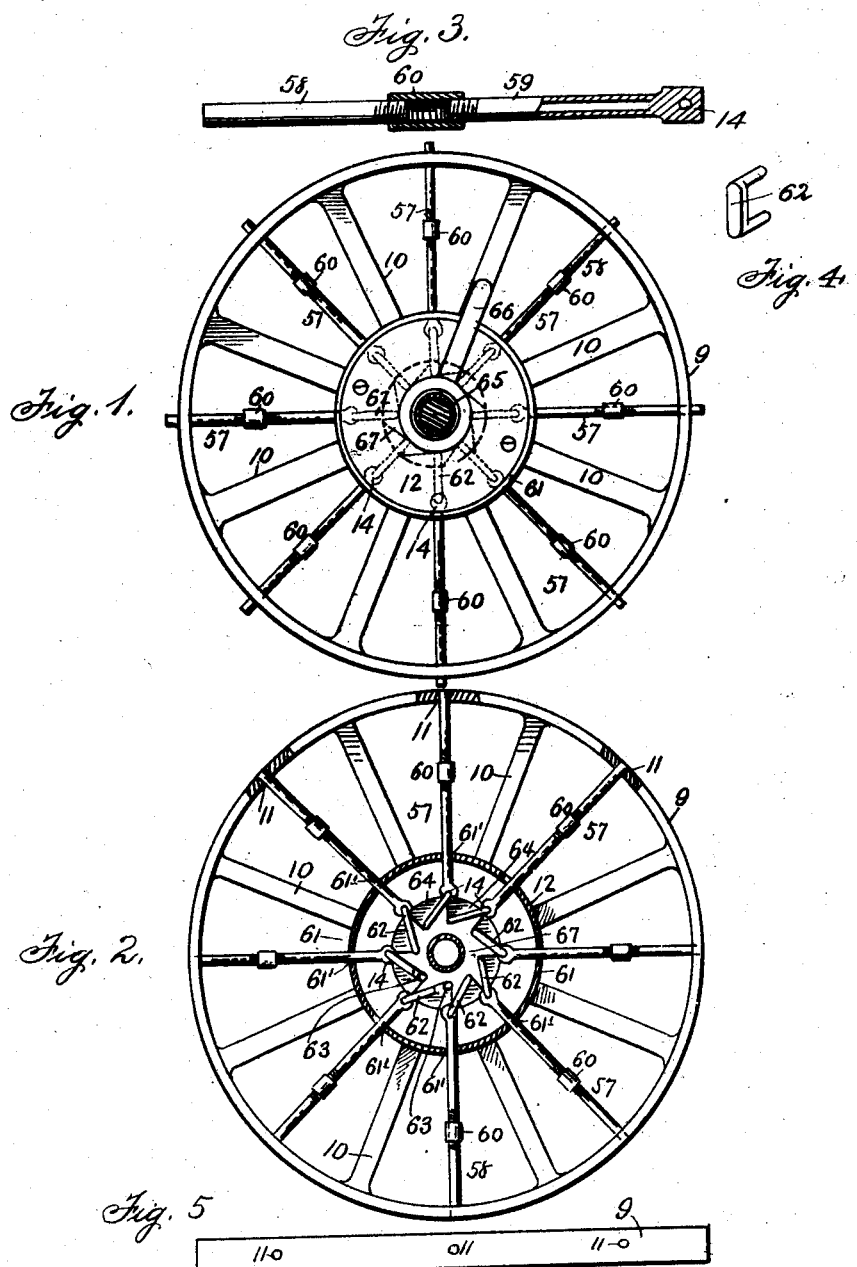

UNITED STATES PATENT OFFICE.

DANIEL T. TIMBERLAKE, OF BAILEYVILLE, KANSAS.

TRACTION-WHEEL.

No. 905,765.　　　Specification of Letters Patent.　　　Patented Dec. 1, 1908.

Original application filed April 25, 1907, Serial No. 370,259. Divided and this application filed August 7, 1907. Serial No. 387,530.

*To all whom it may concern:*

Be it known that I, DANIEL T. TIMBERLAKE, a citizen of the United States, residing at Baileyville, in the county of Nemaha and State of Kansas, have invented certain new and useful Improvements in Traction-Wheels, of which the following is a specification.

My invention relates to an improvement in traction wheels and is a divisional part of my application for traction engines, filed April 25, 1907, No. 370,259, and the object is to provide against slipping and insure proper action of the wheel regardless of the condition of the surface, whether rough or smooth, over which the wheel travels.

With the foregoing object in view, my invention consists: in a wheel having a box located on its inner face, the rim of the box and wheel having orifices, tractors slidably located in said orifices, links connected with the tractors, a flange sleeve to which the other ends of the links are connected, said sleeve having cams thereon and means for turning the sleeve whereby to simultaneously project or retract the tractors.

My invention further consists in certain novel features of construction and combinations of parts which will be hereinafter described and pointed out in the claims.

In the accompanying drawings Figure 1 is a side illustration of my improved wheel; Fig. 2 is a similar view with parts broken away; Fig. 3 is a view of one of the tractors partly in section; Fig. 4 is a view of one of the links in perspective, and Fig. 5 is a fragmentary view in plan.

The numeral 9 indicates the rim of the wheel, 10, 10 are the spokes, preferably cast integral with the rim and hub of the wheel. The rim is provided with orifices 11, 11 preferably midway between the spokes. A box or casing, 12, is secured to the center of the wheel with its rim 61 concentric with the hub and rim of the wheel. This rim 61 of the box is provided with orifices 61', they corresponding in number and position with the orifices 11, 11 in the rim of the wheel. Tractors 57, 57 are slidably mounted in these orifices and their inner ends are provided with eyes 14. One end of each link 62 enters an eye of each tractor, and the other end enters a hole 63 in the flange 64 of the hub sleeve 65. A star shaped cam 67 is secured to the flange 64 in position to operate the tractors. A hand lever 66 is secured to a ring or collar 68, and this ring or collar is secured to the sleeve 65 by a set screw 69. Notches 70, 70 in the rim 61 are in position to receive the lever 66 whereby to lock the latter in its two extreme positions; namely, of projecting or retracting the tractors, the lever springing into these notches when opposite one of them. When it is desired to project the tractors, the hand lever is turned to the position indicated in Fig. 1. When it is desired to retract the tractors, the parts are thrown to the position shown in Fig. 2. Thus in a very simple way the tractors are operated. They might even be thrown in an intermediate position if desired.

In Fig. 3 a special form of tractor is illustrated, consisting of two sections; namely, a solid section 58 of steel and a hollow or lighter section 59 of less substantial material. The adjacent ends of these sections are screw-threaded, and they are held together by means of an internally screw-threaded sleeve 60 whereby the tractors may be lengthened or shortened at will.

It is evident that slight changes might be resorted to in form and arrangement of the several parts described without departing from the spirit and scope of my invention, and hence I do not wish to limit myself to the exact construction herewith set forth, but:

Having fully described my invention, what I claim as new and desire to secure by Letters Patent is:

1. A traction wheel having slidably mounted tractors, a star shaped cam wheel capable of turning with respect to the wheel and links extending from the inner angles of the cam to the tractors whereby one or the other edges of the V shaped notches of the cam wheel serve as lateral supports for the links in their two extreme positions of projecting and retracting the tractors.

2. A traction wheel comprising a rim, a box, the rim of the wheel and the rim of the box having orifices, tractors slidably mounted in said orifices, a flanged sleeve capable of being turned with respect to the wheel and links extending from the flange to the tractors.

3. A traction wheel comprising a rim having orifices thereon, a box the rim of which has orifices, tractors slidably mounted in said orifices, a flanged sleeve capable of turning with respect to the wheel, links extending from the sleeve to the tractors, a star-shaped cam secured to the flange, and means for turning and locking the flange and cam, whereby to project or retract the tractors simultaneously.

4. A traction wheel comprising a hub, rim, spokes, hub sleeve and tractors having sliding connection with the rim, the hub sleeve having a flange, said flange having a star-shaped cam secured thereto and provided with holes opposite the inner angles of the star-shaped cam, and links having one end pivoted in a hole and the other end pivotally connected with a tractor.

In testimony whereof I affix my signature in presence of two witnesses.

DANIEL T. TIMBERLAKE.

Witnesses:
SAML. W. COCKRELL,
VERNON E. HODGES.